US012722950B2

(12) United States Patent
Gerber

(10) Patent No.: US 12,722,950 B2
(45) Date of Patent: Sep. 1, 2026

(54) LOAD LIFT SYSTEM AND METHOD

(71) Applicant: Tidewater Marine Sales LLC, Riviera Beach, FL (US)

(72) Inventor: Charles Gerber, Stuart, FL (US)

(73) Assignee: Tidewater Marine Sales LLC, Riviera Beach, FL (US)

(*) Notice: Subject to any disclaimer, the term of this patent is extended or adjusted under 35 U.S.C. 154(b) by 0 days.

(21) Appl. No.: 19/004,291

(22) Filed: Dec. 28, 2024

(65) Prior Publication Data

US 2025/0214816 A1 Jul. 3, 2025

Related U.S. Application Data

(60) Provisional application No. 63/617,289, filed on Jan. 3, 2024.

(51) Int. Cl.
*B66F 7/16* (2006.01)
*B63C 3/06* (2006.01)

(52) U.S. Cl.
CPC . *B66F 7/16* (2013.01); *B63C 3/06* (2013.01)

(58) Field of Classification Search
CPC .......... B66F 7/16; B66F 7/0683; B66F 7/065; B66F 7/04; B63C 3/06
See application file for complete search history.

(56) References Cited

U.S. PATENT DOCUMENTS

| | | | | |
|---|---|---|---|---|
| 4,109,896 A * | 8/1978 | Ragen | B63C 3/12 187/256 |
| 5,454,625 A * | 10/1995 | Christensen | B66F 7/065 187/244 |
| 6,679,479 B1 * | 1/2004 | Watkins | B66F 7/08 254/9 C |
| 7,810,788 B2 * | 10/2010 | DeVries | B65G 15/00 254/122 |
| 9,321,390 B2 | 4/2016 | Bryant et al. | |
| 9,815,527 B2 | 11/2017 | Robertson et al. | |
| 11,440,457 B1 * | 9/2022 | Blum | B66F 7/28 |
| 2022/0081269 A1 * | 3/2022 | Gao | B66F 7/16 |
| 2023/0271640 A1 * | 8/2023 | Lauderbaugh | B62B 5/06 254/7 C |
| 2023/0406680 A1 * | 12/2023 | Varanasi | B66F 9/065 |
| 2024/0417223 A1 * | 12/2024 | Lee | B66F 7/08 |

FOREIGN PATENT DOCUMENTS

| | | |
|---|---|---|
| EP | 3209545 B1 | 8/2017 |
| KR | 200202547 Y1 * | 11/2000 |
| WO | WO-2024052420 A1 * | 3/2024 |

* cited by examiner

*Primary Examiner* — Minh Truong
*Assistant Examiner* — Michelle M Mudwilder
(74) *Attorney, Agent, or Firm* — Connelly Law PLLC; William J Connelly, III

(57) ABSTRACT

Disclosed is a load lift system and method for lifting load through the load lift system comprising platform arranged to hold load to be lifted, a base frame comprising one or more base bars and a plurality of articulated linkages. Each articulated linkage further comprises two linkage bars connected to the platform with the two linkage bars pivotally connected at center point to facilitate cross-link motion of the two linkage bars connected to the base frame. The load lift system further comprises an elevating mechanism operatively connected to each of the two linkage bars and the base bars. The elevating mechanism is configured to transmit force to the two linkage bars to actuate vertical movement of the platform to lift the load.

14 Claims, 10 Drawing Sheets

LOAD LIFT SYSTEM AND METHOD

CROSS-REFERENCE TO RELATED APPLICATION

This application claims the benefit of U.S. Provisional Patent Application Ser. No. 63/617,289, filed on Jan. 3, 2024, and entitled "Scissor Boat Lift", the entire content of which is hereby incorporated by reference in its entirety.

FIELD OF INVENTION

Embodiments of the present disclosure generally relate to a lift system. More particularly, the embodiments of the present disclosure are directed to a load lift system for lifting boats.

BACKGROUND

Load lift systems are essential tools for elevating heavy loads in various industries, for example, construction, transportation, marine, and manufacturing. These load lift systems are designed to provide safe, efficient, and reliable means of lifting and lowering objects such as vehicles, cargo, or machinery.

One such load system includes boat lifts which are widely used to raise boats out of water for purposes such as storage, maintenance, and/or cleaning. Various types of boat lifts having different lifting mechanisms are generally used. One common issue with conventional boat lifts is their large operational footprint. In conventional boat lifts, the platform often moves laterally during an elevation or lowering, requiring significant horizontal space. This makes the conventional boat lifts unsuitable for areas with limited space, such as marinas, crowded docks, or narrow berths. Further, some of the conventional boat lifts often have uneven application of force during its operation. Many conventional boat lifts rely on single-sided lifting mechanisms or asymmetrical actuation, which may result in uneven lifting.

For example, a typical boat lift generally and conventionally used is as shown in FIG. 1, an example of a conventional use of a boat lift. The boat lift 100 includes a platform 102 that is raised or lowered by using hydraulic mechanisms such as an arrangement of hydraulic cylinder and pistons. The hydraulic mechanism actuates lifting arms 104*a* and 104*b* such that the platform 102 rises/lowers vertically from a base position to a top position or vice versa in an arc or a swing motion as shown with an arrow 108. Further, the platform 102 move laterally as shown with an arrow 106. As shown in the FIG. 1, the boat lift 100 is lifted partially such that the platform 102 has moved laterally to a side while the lifting arms 104*a*-104*b* are moving along the arrow 108.

However, the boat lift 100 requires a large footprint such as the platform 102 travels laterally away from the base when folded. Further, a considerable force and torque is required to raise the boat lift 100 as the hydraulic mechanism pushes one lifting arm. Therefore, the conventional boat lift 100 cannot be suitable for locations with limited space and requires substantially bigger hydraulic mechanism for bigger boats/loads.

Therefore, there is a need for an improved and advanced boat lift that can administer the aforementioned limitations more efficiently than what has been conventionally provided for boat lift systems or the like.

SUMMARY

Embodiments in accordance with the present invention may provide a load lift system interchangeably referred to as a boat lift system. The load lift system comprises of a platform arranged to hold a load to be lifted, a base frame comprising one or more base bars and a plurality of articulated linkages. Each articulated linkage of the plurality of articulated linages comprises two linkage bars connected to the platform. The two linkage bars are pivotally connected at a center point to facilitate a cross-link motion of the two linkage bars, and the two linkage bars are connected to the base frame. The boat lift system further comprises an elevating mechanism operatively connected to each of the two linkage bars and the base bars. The elevating mechanism is configured to transmit force to the two linkage bars to actuate vertical movement of the platform to lift the load.

Embodiments in accordance with the present invention further may provide a load lift system comprising a plurality of articulated linkages. Each articulated linkage of the plurality of articulated linages comprises two linkage bars connected to a platform holding a load to be lifted. The two linkage bars are pivotally connected at a center point to facilitate a cross-link motion of the two linkage bars and an elevating mechanism operatively connected to each of the two linkage bars. The elevating mechanism is configured to transmit lifting force to the two linkage bars to actuate a vertical movement of the platform for lifting a load.

Embodiments in accordance with the present invention further provide a method for lifting a load through a load lift system. The method comprising: actuating an elevating mechanism to enable movement of two linkage bars provided in each articulated link of a plurality of articulated linkages of the load lift system, wherein the two linkage bars are connected to a platform arranged to hold the load to be lifted; and transmitting force to the two linkage bars to actuate a vertical movement of the platform to lift the load to a desired height.

In some embodiments of the present invention, the elevating mechanism may comprise a hydraulic mechanism configured to actuate the two linkage bars and a lever mechanism operatively connected to the hydraulic mechanism. The lever mechanism may be configured to transmit force from the hydraulic mechanism to the two linkage bars to raise and lower the platform in a vertical direction enabling the vertical movement.

In some embodiments of the present invention, the lever mechanism may comprise a hinge mechanism to connect a lever of the liver mechanism to the hydraulic mechanism.

In some embodiments of the present invention, the hydraulic mechanism may comprise a handle bar arranged to be pulled up or pulled down to actuate the lever mechanism of the hydraulic mechanism. The lever mechanism when actuated may move ends of the two linkage bars laterally along the one or more base bars.

In some embodiments of the present invention, the hydraulic mechanism may comprise one or more pistons connected to the hinge mechanism. The pistons having piston rod are arranged to actuate the hinge mechanism and guide the lever on a track attached to the two linkage bars.

In some embodiments of the present invention, the elevating mechanism may be configured to be operated in at least one of an electrical mode, and a manual mode.

In some embodiments of the present invention, the one or more base bars may further comprise stabilizing bars with each stabilizing bar comprising two adjustable ends for leveling the lifting of the load. The two adjustable ends may be adjusted to a predefine height to level the base bars to lift the load to a desired height.

In some embodiments of the present invention, each linkage bar of the two linkage bars may comprise two bars movably connected at a center point to enable each linkage bar of the two linkage bars to move with respect to other linkage bar of the two-linkage bar in the cross-link motion.

In some embodiments of the present invention, the two linkage bars may be rotatably connected at one end to the base bars via a hinge connection to enable each linkage bar of the two linkage bars to rotate with respect to the base bars.

In some embodiments of the present invention, the platform may comprise one or more rails to support the load to be lifted, wherein a top end of the one or more rails is connected to each of the two linkage bars.

In some embodiments of the present invention, the two linkage bars may be connected at a first end of one or more rails provided in the platform via a hinge connection such that each linkage bar of the two linkage bars rotate with respect to the rails at the first end, wherein the two linkage bars are connected at a second end of the rails through a track mechanism, wherein the track mechanism enable the rails to slide laterally with respect to the two linkage bars.

In some embodiments of the present invention, the two linkage bars may be attached at the second end of the rails to allow a freedom of movement along the track when raising and lowering the load lift system vertically.

Embodiments of the present invention may provide a boat lift that may provide a lesser footprint as compared to conventional boat lifts.

Embodiments of the present invention may provide a boat lift having a lever mechanism and a hydraulic mechanism that may further provide a mechanical advantage to easily operate (raise/lower) the load lift system with lesser force as compared to conventional boat lifts.

Embodiments of the present invention may provide a boat lift that may ensure vertical lifting without significant lateral movement of the platform. Such vertical lifting may minimize required space, making the system ideal for use in areas with limited room, such as crowded docks or narrow marinas.

Embodiments of the present invention may provide a boat lift that may distribute force evenly during operation, reducing stress on the platform. This may further enhance the load lift system stability and ensure the smooth lifting and lowering of loads, such as boats.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
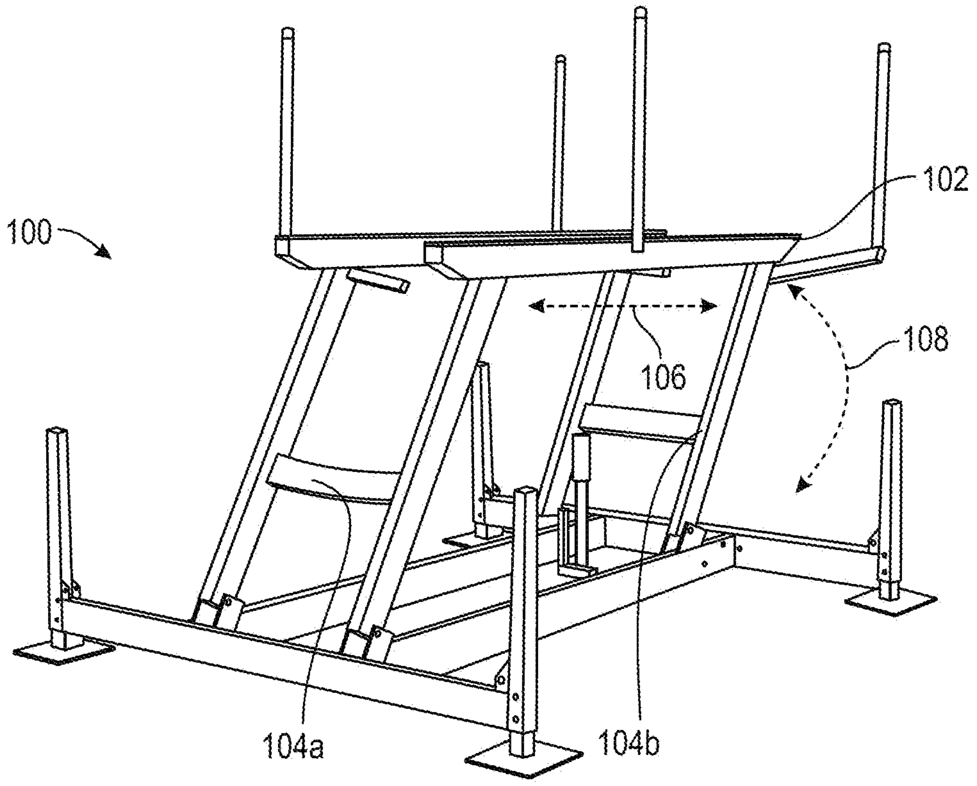
FIG. 1 Prior Art
FIG. 1 is a typical and conventional example of a boat lift for raising a boat in reference to the state of the art.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation is performed. Human input that consents to the performance of the process or operation is not deemed to be "material".

Although various embodiments are described with respect to a boat lift, it is contemplated that the approaches of the various embodiments described herein are applicable to lifting mechanism for any other object as required or recommended.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 2:
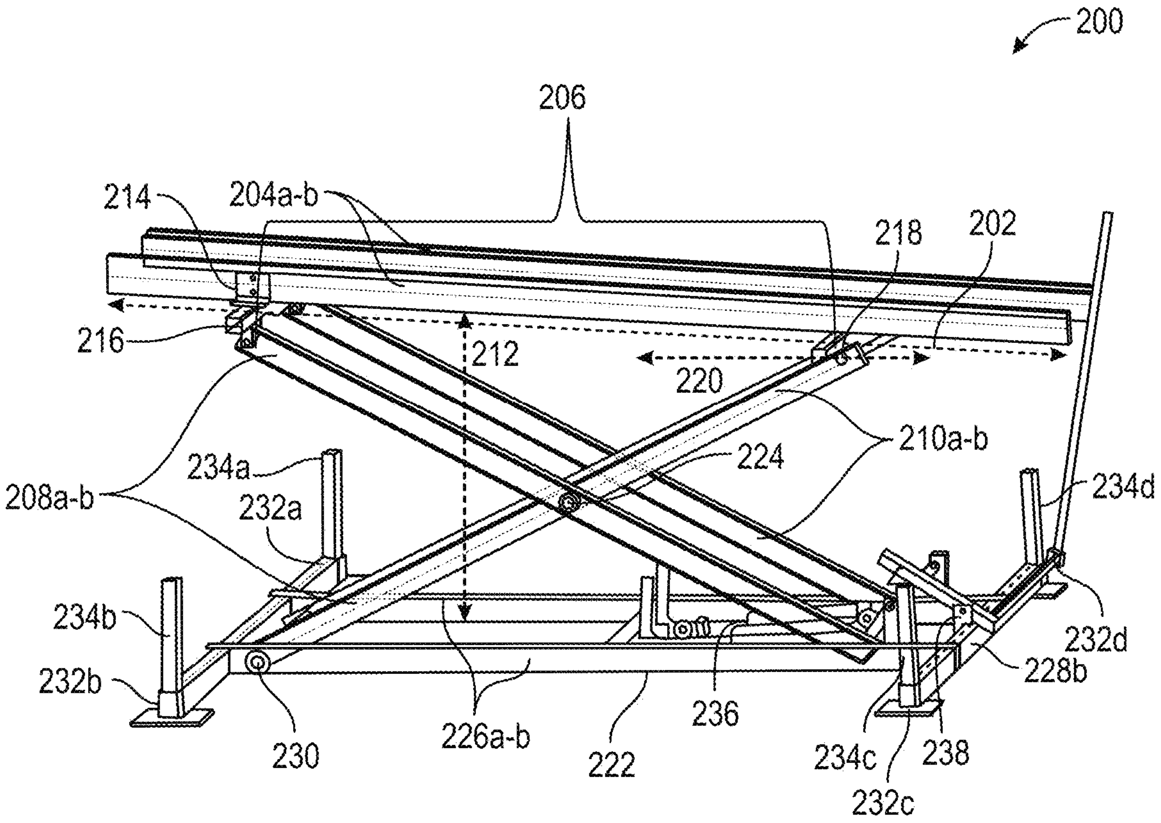
FIG. 2 illustrates a side view of a load lift system, according to one embodiment of the present invention.

In an embodiment of the present invention, FIG. 2 illustrates a side view of a load lift system 200. In an exemplary scenario, the load lift system 200 may be deployed at various locations such as docks for lifting boats out of water for storage, maintenance or cleaning. In other embodiments, other locations other than docks can be used for the load lift system 200.

In an embodiment of the present invention, the load lift system 200 may be used in conjunction with a load of any weight that is to be supported, lifted, or moved by the load lift system 200. In an embodiment of the present invention, the load may be a static (stationary) load in a set position. In another embodiment of the present invention, the load may be dynamic (in motion) and in multiple positions. In an embodiment of the present invention, the load may vary in size, shape, and distribution. Embodiments of the present invention are intended to include or otherwise cover any size, shape, and distribution, including known, related art, and/or later developed technologies.

The load herein may refer to the boat being supported and elevated by the load lift system 200 (may alternatively be referred as the boat lift system 200). For instance, if the load lift system 200 is used to raise a 5,000-pound speedboat out of the water for maintenance, the speedboat can thereby represent the load.

The load lift system 200 may comprise a platform 202 (marked with an arrow). The load, herein the boat, may be placed on the platform 202. The platform 202 may be supported by a cross-link motion (may also be referred as scissor motion discussed later in detail) that moves vertically up and down when the load lift system 200 is operated. In an exemplary scenario, the platform 202 may be configured to include an anti-slip material to ensure safe handling of the load such as the 5,000 pound speedboat.

The platform 202 may further comprise rails 204*a*-204*b* to connect each articulated linkage 206 of a plurality of articulated linkages to the platform 202. In an exemplary scenario, FIG. 2 shows one single articulated linkage 206 for the purpose of understanding. Nevertheless, the scope of the embodiment is not limited to the single articulated linkage 206 and may be extended to the plurality of articulated linkages in the load lift system 200.

The articulated linkage 206 may comprise two linkage bars 208*a*-208*b*, and 210*a*-210*b*. The two linkage bars 208*a*-208*b*, 210*a*-210*b* may now be alternatively referred as first scissor bars 208*a*-208*b* (or first scissor bars 208*a*-208*b*) and second scissor bars 210*a*-210*b* (or second scissor bar 210*a*-210*b*) connected to the platform 202. The first scissor bars 208*a*-208*b* can be a lower set of bars that pivot and move in the scissor motion. The second scissor bars 210*a*-210*b* can be an upper set of bars similarly connected in the scissor motion. The first scissor bars 208*a*-208*b* and the second scissor bars 210*a*-210*b* may be collectively referred as scissor bars 208*a*-208*b*, 210*a*-210*b*.

The scissor motion of the scissor bars 208*a*-208*b*, 210*a*-210*b* may provide the vertical motion to the platform 202 as shown with an arrow 212. Accordingly, due to the scissors bars 208*a*-208*b*, 210*a*-210*b*, any load on the platform 202 may be raised or lowered by operating the scissor bars 208*a*-208*b*, 210*a*-210*b*. Therefore, the footprint of the scissor boat lift can be reduced in comparison to more conventional boat lifts. In an exemplary scenario, the scissor bars 208*a*-208*b*, 210*a*-210*b* are constructed from a lightweight, high-strength material such as aluminum or composite metal to optimize durability and weight. Embodiments of the present invention are intended to include or otherwise cover any material, including known, related art, and/or later developed technologies currently in use in the know or related art.

In an embodiment of the present invention, the scissor bars 208*a*-208*b*, 210*a*-210*b* can be connected at top ends to the rails 204*a*-204*b* provided in the platform 202. The rails 204*a*-204*b* form the platform 202 that supports the load (e.g., a boat) to be raised/lowered. For example, when the scissor bars 208*a*-208*b*, 210*a*-210*b* open, the platform 202 rises. Further, when the scissor bars 208*a*-208*b*, 210*a*-210*b* close, the platform 202 can lower, which thereby lifts and lowers the load.

As shown in the FIG. 2, the scissor bars 208*a*-208*b*, 210*a*-210*b* may be connected at a first end 214 of the rails 204*a*-204*b* through a hinge connection 216. Therefore, the scissor bars 208*a*-208*b*, 210*a*-210*b* may rotate with respect to the rails 204*a*-204*b* at the first end 214. Further, the scissor bars 208*a*-208*b*, 210*a*-210*b* may be connected at a second end 218 of the rails 204*a*-204*b* through a track mechanism. The track mechanism may enable the rails 204*a*-204*b* to slide laterally with respect to the scissor bars 208*a*-208*b*, 210*a*-210*b* as shown with an arrow 220 in FIG. 2. In an embodiment of the present invention, the scissor bars 208*a*-208*b*, 210*a*-210*b* may be freely attached at the second end 218 of the rails 204*a*-204*b* to allow a freedom of movement along the track when raising and lowering the load boat lift 200.

The scissor bars 208*a*-208*b*, 210*a*-210*b* may be pivotally connected at a center point 224 to facilitate the cross-link motion of the scissor bars 208*a*-208*b*, 210*a*-210*b*. As shown in FIG. 2, the first scissor bars 208*a*-208*b* may include at least two bars movably connected at the center point 224 such that the two bars may move with respect to each other in the scissor motion. Similarly, the second scissor bars 210*a*-210*b* may include at least two bars connected at their center (not shown) such that the two bars may move with respect to each other in the scissor motion.

In an exemplary scenario, the scissor motion may further refer to a coordinated, pivoting movement of the scissor bars 208*a*-208*b*, 210*a*-210*b* that are connected at the center point 224, resembling an action of a pair of scissors. The scissor motion may allow the scissor bars 208*a*-208*b*, 210*a*-210*b* to expand or contract in a controlled manner, thereby enabling vertical or horizontal displacement of connected components, such as platform 202, in the load lift system 200.

In an embodiment of the present invention, the two linkage bars 208*a*-208*b*, 210*a*-210*b* may be connected to a base frame 222. The base frame 222 may be located at a bottom of the load lift system 200, in an embodiment of the present invention. The base frame 222 may comprise base bars 226*a*-226*b*, and stabilizing bars 228*a*-228*b*.

Further, the first scissor bars 208*a*-208*b* and the second scissor bars 210*a*-210*b* may be rotatably connected at one end to the base bars 226*a*-226*b* respectively. In an embodiment of the present invention, the rotatable connection to the base bars 226*a*-226*b* may be a hinge connection 230. The hinge connection 230 may enable the first scissor bars 208*a*-208*b* to rotate with respect to the base bars 226*a*-226*b*.

The stabilizing bars 228*a*-228*b* may each having two adjustable ends 232*a*-232*b* for leveling the load lift system 200 may be provided in the base bars 226*a*-226*b* to achieve additional support. In a preferred embodiment of the present invention, the base bars 226*a*-226*b* of the load lift system 200 may be leveled by adjusting the respective adjustable ends 232*a*-232*b*, 232*c*-232*d* of the stabilizing bars 228*a*-228*b* to a desired height. For example, a desired height for levelling the load lift system 200 may be set to at least 5 feet above water level.

In an exemplary scenario, the two adjustable ends 232*a*-232*b*, 232*c*-232*d* may be adjusted to a predefined height, for example, but not limited to, 6 inches on one side and 8 inches on the other side, to level the base bars 226*a*-226*b* to lift the load to the desired height.

Each end 232*a*-232*b* of the stabilizing bars 228*a*-228*b* may be connected to a respective pole of the four poles 234*a*-234*b*-234*c*-234*d*. The four poles 234*a*-234*b*-234*c*-234*d* may provide additional structural stability and anchoring for the load lift system 200 by working in conjunction with the stabilizing bars 228*a*-228*b*.

Still referring to FIG. 2, the load lift system 200 may further comprise an elevating mechanism operatively connected to each of the scissor bars 208*a*-208*b*, 210*a*-210*b*. The elevating mechanism may be configured to transmit a lifting force to the two linkage bars 208*a*-*b*, 210*a*-210*b* to actuate vertical movement of the platform 202 to lift the load.

In an embodiment of the present invention, the elevating mechanism operatively connected to each of the scissor bars 208*a*-208*b*, 210*a*-210*b* may comprise a hydraulic mechanism 236. The hydraulic mechanism 236 may be configured to actuate the two linkage bars 208*a*-208*b*, 210*a*-210*b* and a lever mechanism 238 operatively connected to the hydraulic mechanism 236. The lever mechanism 238 may be configured to transmit a force from the hydraulic mechanism 236 to the scissor bars 208*a*-208*b*, 210*a*-210*b* to raise and lower the platform 202 in a vertical direction. The elevating mechanism may be connected to the base bars 226*a*-226*b*. The components and operation of the elevating mechanism is explained in more details in conjunction with each of FIG. 3A, FIG. 3B and FIG. 3C.

In an embodiment of the present invention, the elevating mechanism, i.e., the hydraulic mechanism 236 may be configured to be operated in an electrical mode. The hydraulic mechanism 236 may be configured to be operated in a manual mode, in another embodiment of the present invention.

Figure 3A:
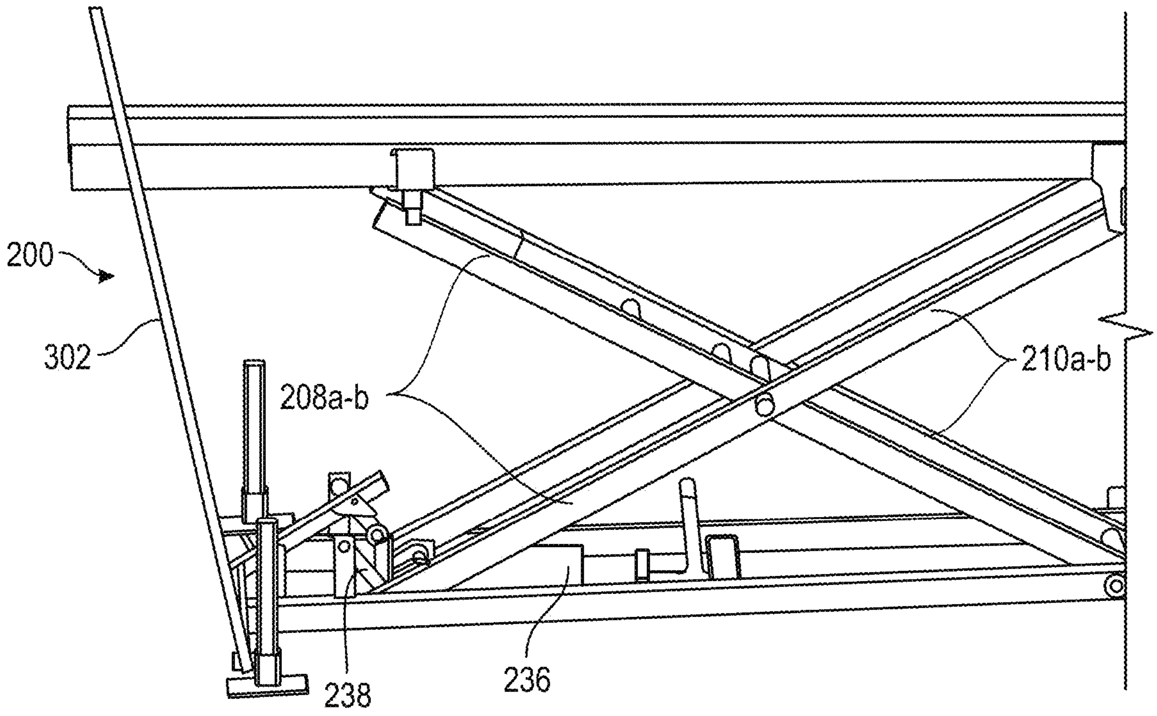
FIG. 3A, FIG. 3B and FIG. 3C illustrate an elevating mechanism of the load lift system, according to one embodiment of the present invention.
Figure 3B:
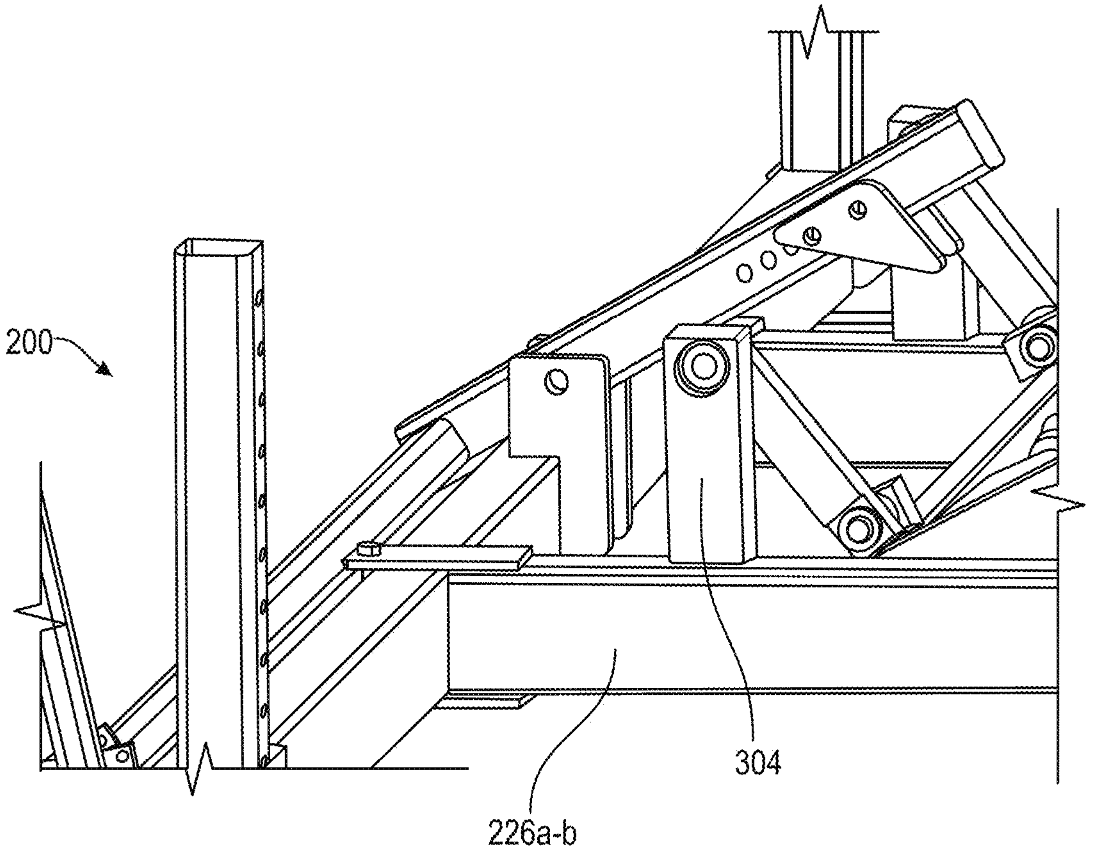
Figure 3C:
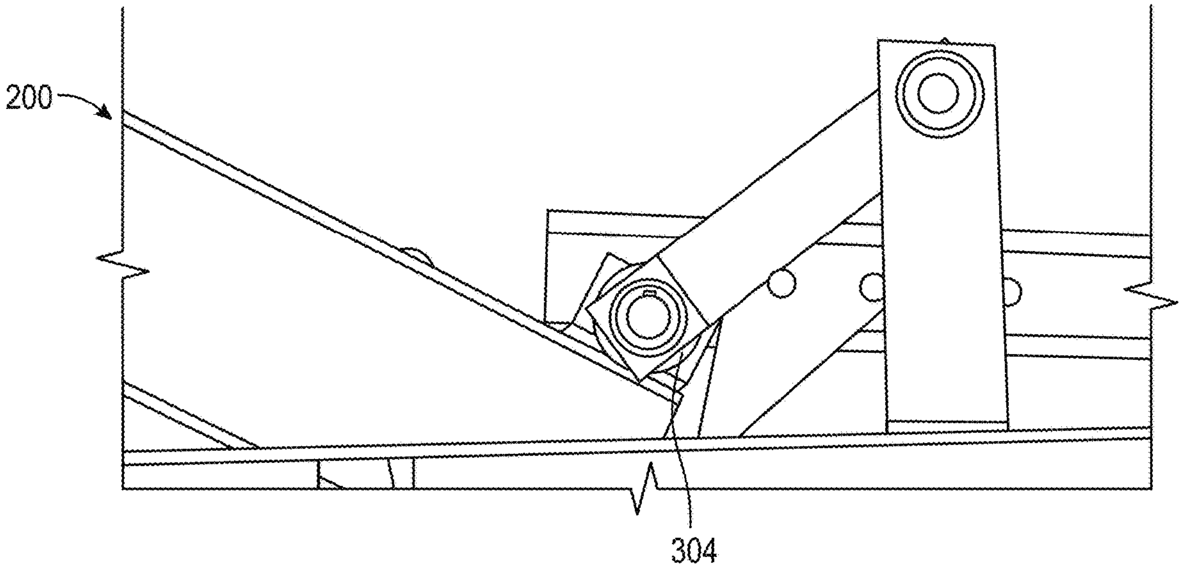

In some embodiments of the present invention, each of FIG. 3A, FIG. 3B, and FIG. 3C illustrate details of the elevation mechanism of the load lift system 200. As shown in the FIG. 3A, the hydraulic mechanism 236 may be connected to the scissor bars 208*a*-208*b*, 210*a*-210*b* through the lever mechanism 238. In an embodiment of the present invention, the hydraulic mechanism 236 may include a hydraulic cylinder with piston rods (not shown in the FIG. 3A).

In an embodiment of the present invention, the hydraulic mechanism 236 may be operated by actuating a handle bar 302. For example, the handle bar 302 may be pulled up/down to actuate the hydraulic mechanism 236. In turn, the hydraulic mechanism 236 may actuate the lever mechanism 238 that pulls or pushes the ends of the scissor bars 208*a*-208*b*, 210*a*-210*b* laterally along the base bars 226*a*-226*b*. The pushing/pulling of the ends of the scissor bars 208*a*-208*b*, 210*a*-210*b* may result in a vertically upward/downward motion arrow 212 of the platform 202 of the load lift system 200, as shown in the FIG. 2. Therefore, the lever mechanism 238 and the hydraulic mechanism 236 may provide mechanical advantage to easily operate (raise/lower) the load boat lift 200. A person skilled in the art will appreciate that any known mechanical joining arrangements such as, but not limited to, ball joints, pin or knuckle joints may be used to join the components of the elevating mechanism.

The lever mechanism 238 may be an arrangement of mechanical components that may enable operation of the load lift system 200. As shown in each of the FIG. 3B and FIG. 3C in combination, the lever mechanism 238 may include a hinge mechanism 304 that connects a lever 400 (shown in FIG. 4A), to the hydraulic mechanism 236.

Figure 4A:
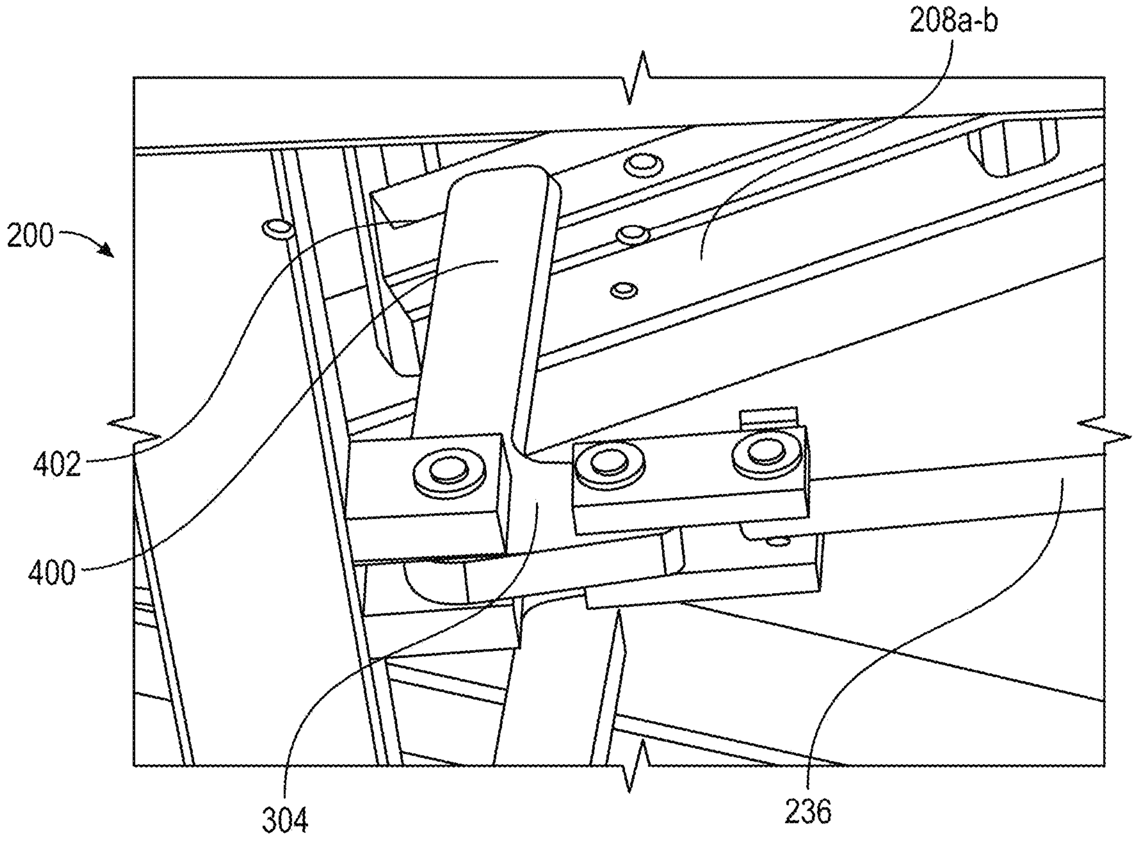
FIG. 4A and FIG. 4B illustrate a hinge mechanism of the load lift system, according to one embodiment of the present invention.
Figure 4B:
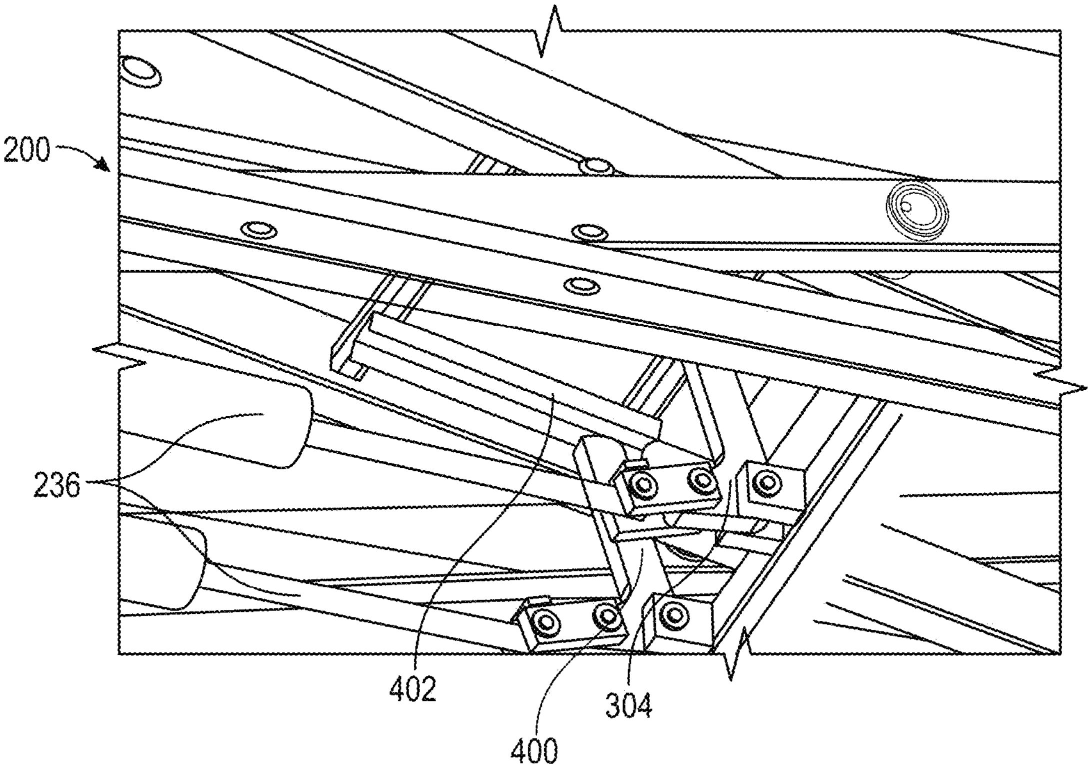

In some embodiments of the present invention, each of the FIG. 4A and FIG. 4B illustrate close up views of the hinge mechanism lever mechanism 238. In an embodiment of the present invention, the pistons may be connected to the hinge mechanism 304. As discussed above, the piston rod of the pistons of the hydraulic mechanism 210 may actuate the hinge mechanism 304 and the lever 400 may then be guided on a track 402 attached to the scissor bars 208*a*-208*b*, 210*a*-210*b*.

In an exemplary scenario, the piston and the lever 400 work together as part of hydraulic actuation and force transmission facilitated through the hydraulic mechanism 236 to enable the lifting motion of the platform 202 in the load lift system 200. The piston, which operates within the hydraulic cylinder of the hydraulic mechanism 236 may be responsible for generating the lifting or lowering force. This may be achieved through hydraulic fluid under pressure that drives the piston rod forward or backward. Since, the piston rod may be connected to the hinge mechanism 304, therefore, when the hydraulic fluid actuates the piston, the piston rod moves, applying the force to the hinge mechanism 304. This movement initiates the force transmission process thus allowing the lifting or lowering of the platform 202 to occur smoothly and at a desired rate.

FIG. 4B illustrates the lever 400 engaging the scissor bars 208*a*-208*b*, 210*a*-210*b* through the track 402 and beginning to push the scissor bars 208*a*-208*b*, 210*a*-210*b* and lift in an upward motion.

Figure 5:
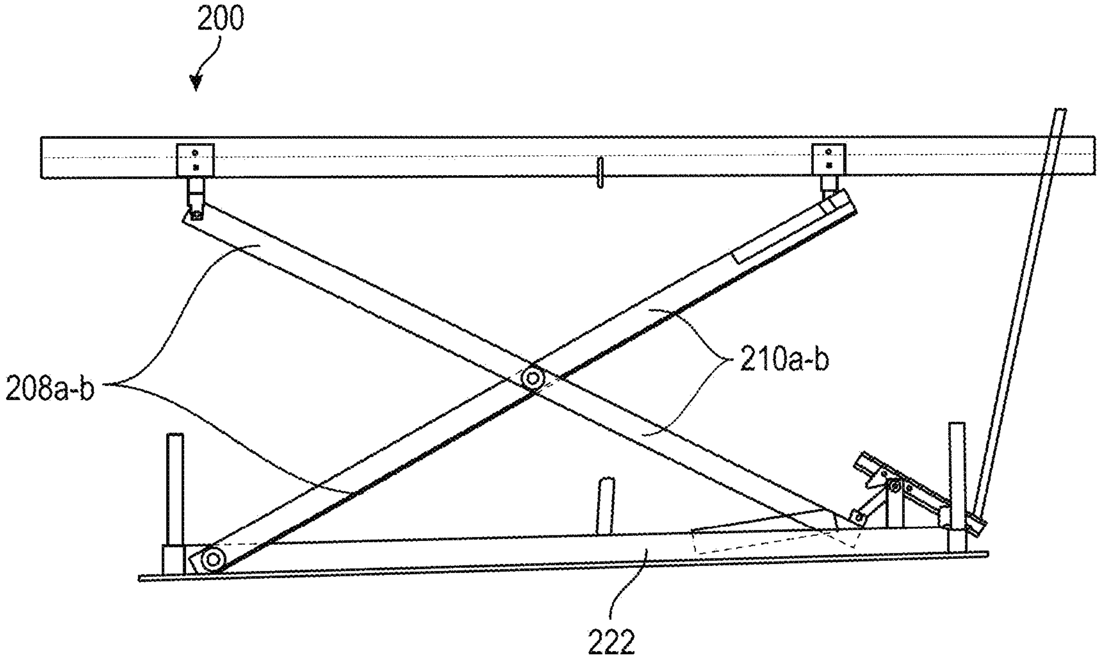
FIG. 5 illustrates a side view of a partially raised load lift system, according to one embodiment of the present invention.

FIG. 5 illustrates a side view of a partially raised load lift system 200, according to one embodiment of the present invention. In an exemplary scenario, in the partially raised load lift system 200, the base frame 222 may remain stationary and securely positioned on the ground or submerged surface and may provide foundational support to the load lift system 200. The scissor bars 208*a*-208*b*, 210*a*-210*b* may be in a partially expanded configuration and may be angled relative to one another instead of being fully collapsed (horizontal) or fully extended (vertical). The platform 202 supporting the load may be elevated partially above its original position.

The hydraulic mechanism 236 may be partially actuated, with the piston rods being extended to a degree that corresponds to the partial elevation of the scissor bars 208*a*-208*b*, 210*a*-210*b*.

Figure 6:
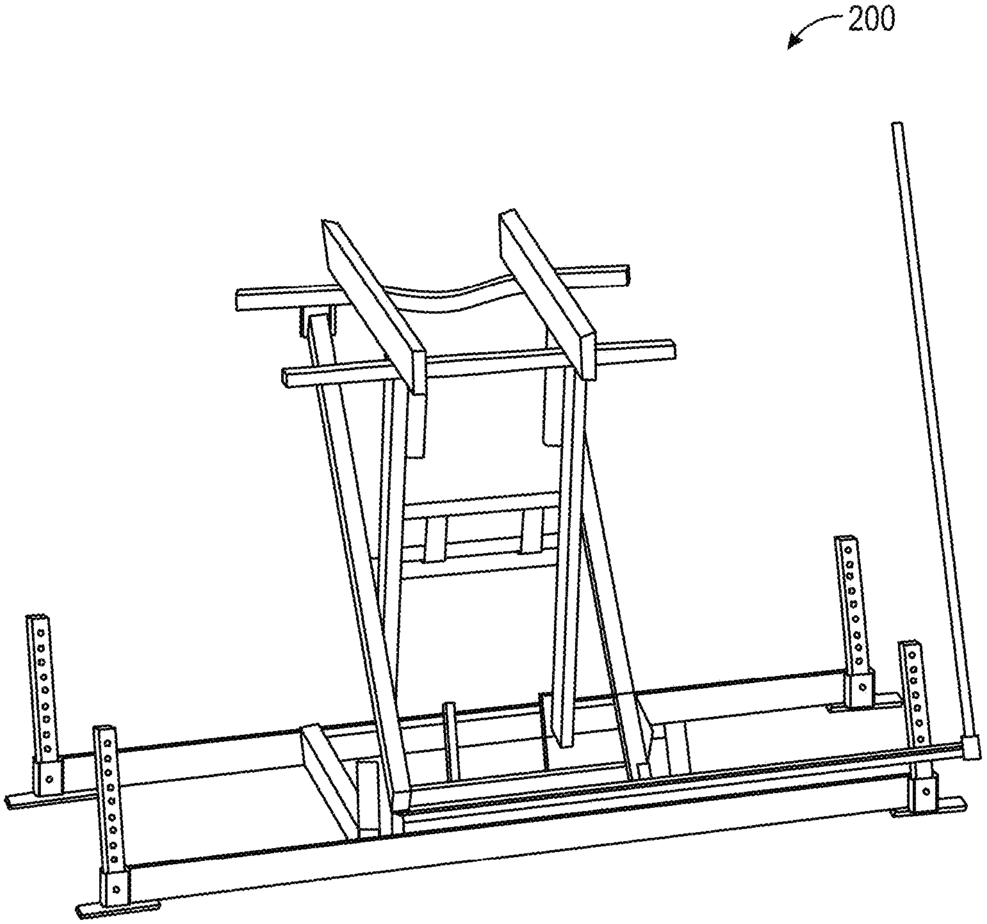
FIG. 6 illustrates a fully raised load lift system, according to one embodiment of the present invention.

FIG. 6 illustrates fully raised load lift system 200 capable of lifting the boat (not shown), according to one embodiment of the present invention. In an exemplary scenario, when the load lift system 200 is in a fully raised position, it can achieve maximum vertical elevation to lift and securely support the load, such as the boat, above its original resting position.

In an alternate embodiment of the present invention, the load lift system 200 (as shown in the FIG. 2) may comprise of plurality of articulated linkages with each articulated linkage 206 of the plurality of articulated linages comprising two linkage bars 208*a*-208*b*, 210*a*-210*b*, connected to the platform 202 holding the load to be lifted. The two linkage bars 208*a*-208*b*, 210*a*-210*b* may be pivotally connected at the center point 224 to facilitate the cross-link motion of the scissor bars 208*a*-208*b*, 210*a*-210*b*. The load lift system 200 may further comprise the elevating mechanism operatively connected to each of the scissor bars 208*a*-208*b*, 210*a*-210*b*. The elevating mechanism may be configured to transmit lifting force to the scissor bars 208*a*-208*b*, 210*a*-210*b* to actuate a vertical movement of the platform 202 to lift the load.

Details of the alternate embodiment of the load lift system 200 are similar to details as discussed above in FIG. 2 in conjunction with FIGS. 3 to FIG. 6 and hence are not repeated for the sake of brevity.

Figure 7:
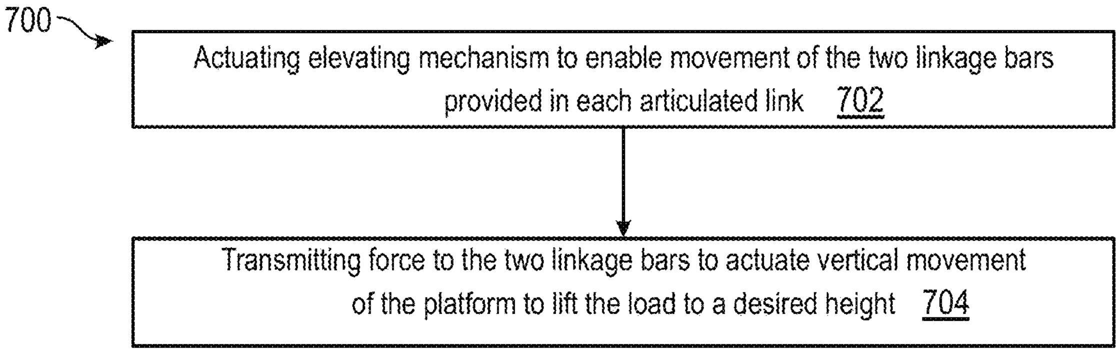
FIG. 7 illustrates a flow chart for a method of lifting a load through the load lift system of the FIG. 1, according to one embodiment of the present invention.

FIG. 7 illustrates a flow chart of a method 700 for lifting a load through the load lift system 200.

At step 702, the method 700 may provide actuating the elevating mechanism to enable movement of the scissor bars 208*a*-208*b*, 210*a*-210*b* provided in each articulated linkage 206 of the plurality of articulated linkages of the load lift system 200. The two scissor bars 208*a*-208*b*, 210*a*-210*b* can be connected to the platform 202 and arranged to hold the load to be lifted.

At step 704, the method 700 may provide transmitting force to the two scissor bars 208*a*-208*b*, 210*a*-210*b* to actuate the vertical movement of the platform 202 to lift the load to a desired height.

In some embodiments of the present invention, the actuating of the elevating mechanism may comprise actuating the hydraulic cylinder in a hydraulic mechanism 236 in the elevating mechanism to apply lifting force to the scissor bars 208*a*-208*b*, 210*a*-210*b*, thereby lifting the platform 202 and the load supported on the platform 202. The actuation of the elevation mechanism may be controlled to raise or lower the platform 202 to lift the load to the desired height.

In an embodiment of the present invention, the actuating of the elevating mechanism may further comprise of pulling the handle bar 302 of the hydraulic mechanism 236 to actuate the lever mechanism 238 in the hydraulic mechanism 236. Moving, the ends of the scissor bars 208*a*-208*b*, 210*a*-210*b*, laterally along base bars 226*a*-226*b* based on the pulling of the handle bars 302 and transmitting lifting force from the hydraulic mechanism 236 to the scissor bars 208*a*-208*b*, 210*a*-210*b* to raise the platform 202. The platform 202 may be raised and lowered in the vertical direction based on the transmission of the lifting force. The actuating is performed in at least one of the manual mode or the automatic mode, as discussed above.

In an embodiment of the present invention, the scissor bars 208*a*-208*b*, 210*a*-210*b*, are pivotally connected at the center point 224 to facilitate the cross-link motion of the scissor bars 208*a*-208*b*, 210*a*-210*b*, and the scissor bars 208*a*-208*b*, 210*a*-210*b*, are rotatably connected at one end to base bars 226*a*-226*b* of the base frame 222 in the load lift system 200.

In an embodiment of the present invention, the two adjustable ends 232*a*-232*b*, 232*c*-232*d* of each stabilizing bar of stabilizing bars 228*a*-228*b* provided in the base bars 226*a*-226*b* may be adjusted to the predefined height to level the base bars 226*a*-226*b* to lift the load to the desired height.

In an embodiment of the present invention, the one or more rails 204*a*-204*b* in the platform 202 may be provided to support the load to be lifted. The top end of the one or more rails 204*a*-204*b* may be connected to each of the scissor bars 208*a*-208*b*, 210*a*-210*b*. The scissor bars 208*a*-208*b*, 210*a*-210*b* may be connected at the first end 214 of one or more rails 204*a*-204*b* provided in the platform 202 via the hinge connection 216 such that each linkage bar of the two linkage bars 208*a*-208*b*, 210*a*-210*b* rotate with respect to the rails 204*a*-204*b* at the first end 214. The linkage bars 208*a*-208*b*, 210*a*-210*b* may be connected at the second end 218 of the rails 204*a*-204*b* through the track mechanism. The track mechanism may enable the rails 204*a*-204*b* to slide laterally with respect to the linkage bars 208*a*-208*b*, 210*a*-210*b*.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The exemplary embodiments of this present invention have been described in relation to a scissor boat lift. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art are able to understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following description reflects, inventive aspects lie in less than all features of a single foregoing disclosed embodiment, configuration, or aspect. Thus, the following description is hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A load lift system, comprising:

a platform arranged to hold a load to be lifted;

a base frame comprising one or more base bars;

a plurality of articulated linkages, wherein each articulated linkage of the plurality of articulated linkages comprises two upper bars of each articulated linkage connected to the platform, wherein the two upper bars of each articulated linkage are pivotally connected at a center point to facilitate a cross-link motion of the two upper bars of each articulated linkage, and wherein the two upper bars of each articulated linkage are connected to the base frame, wherein a top end of the two upper bars of each articulated linkage is positioned underneath a rail system with an open area between the rail system and the top end, wherein the platform comprises the rail system that includes two rails that are in parallel, wherein the rail system is configured to slide horizontally in one or more intervals over the top end of the two upper bars of each articulated linkage; and an elevating mechanism operatively connected to each of the two upper bars of each articulated linkage and the base bars, wherein the elevating mechanism is configured to transmit lifting force to the two upper bars of each articulated linkage to actuate a vertical movement of the platform to lift the load, wherein the elevating mechanism includes a hydraulic mechanism that actuates the two upper bars of each articulated linkage, and a lever mechanism operatively connected to the hydraulic mechanism that transmits the lifting force from the hydraulic mechanism to the two upper bars of each articulated linkage to raise and lower the platform in a vertical direction that enables the vertical movement, wherein lever mechanism includes a hinge mechanism that connects a lever of the lever mechanism to the hydraulic mechanism, wherein the hydraulic mechanism comprises one or more pistons connected to the hinge mechanism, wherein the one or more pistons actuate the hinge mechanism and guide the lever mechanism on a track attached to the two upper bars of each articulated linkage.

2. The load lift system of claim 1, wherein the one or more base bars further comprises stabilizing bars for leveling the lifting of the load.

3. The load lift system of claim 2, wherein each stabilizing bar comprises an adjustable end, wherein the adjustable end is adjusted to a predefined height to level the base bars to lift the load to a desired height.

4. The load lift system of claim 1, wherein each bar of the two upper bars of each articulated linkage comprises two bars movably connected at the center point to enable each bar of the two upper bars of each articulated linkage to move with respect to the other bar of each two bar linkage in the cross-link motion.

5. The load lift system of claim 1, wherein a top end of the two rails is connected to each of the two upper bars of each articulated linkage.

6. The load lift system of claim 1, wherein the hydraulic mechanism comprises a handlebar arranged to be pulled up or pulled down to actuate the lever mechanism of the hydraulic mechanism, wherein the lever mechanism when actuated moves ends of the two upper bars of each articulated linkage laterally along the one or more base bars.

7. The load lift system of claim 1, wherein the two upper bars are rotatably connected at one end to the base bars via a hinge connection to enable each bar of the two upper bars of each articulated linkage to rotate with respect to the base bars.

8. The load lift system of claim 7, wherein the two upper bars of each articulated linkage are connected at a first end of the two rails provided in the platform via a hinge connection such that each bar of the two upper bars of each articulated linkage rotate with respect to the two rails at the first end, wherein the two upper bars of each articulated linkage are connected at a second end of the two rails through a track mechanism, wherein the track mechanism enables the two rails to slide laterally with respect to the two upper bars of each articulated linkage.

9. The load lift system of claim 8, wherein the two upper bars of each articulated linkage are attached at the second end of the one or more rails to allow a freedom of movement along the track mechanism when raising and lowering the load lift system vertically.

10. A load lift system, comprising:

a plurality of articulated linkages, wherein each articulated linkage of the plurality of articulated linkages comprises two upper bars connected to a platform holding a load to be lifted, wherein the two upper bars of each articulated linkage are pivotally connected at a center point to facilitate a cross-link motion of the two upper bars of each articulated linkage, wherein a top end of the two upper bars of each articulated linkage are positioned underneath a rail system, with an open area between the rail system and the top end, wherein the platform comprises the rail system that includes two rails that are in parallel, wherein the rail system is configured to slide horizontally in one or more intervals over the top end of the two upper bars of each articulated linkage; and an elevating mechanism operatively connected to each of the two upper bars of each articulated linkage, wherein the elevating mechanism is configured to transmit lifting force to the two upper bars of each articulated linkage to actuate a vertical movement of the platform to lift the load, wherein the elevating mechanism includes a hydraulic mechanism that actuates the two upper bars of each articulated linkage and a lever mechanism operatively connected to the hydraulic mechanism that transmits the lifting force from the hydraulic mechanism to the two upper bars of each articulated linkage to raise and lower the platform in a vertical direction that enables the vertical movement, wherein the hydraulic mechanism comprises a handlebar arranged to be pulled up or pulled down to actuate the lever mechanism, wherein the lever mechanism moves ends of the two upper bars of each articulated linkage laterally when the lever mechanism is actuated, and wherein the hydraulic mechanism comprises one or more pistons connected to the hinge mechanism that actuate the hinge mechanism and guide the lever on a track attached to the two upper bars of each articulated linkage.

11. The load lift system of claim 10, wherein the lever mechanism comprises a hinge mechanism to connect a lever of the lever mechanism to the hydraulic mechanism.

12. A method for lifting a load through a load lift system, the method comprising:

actuating an elevating mechanism to enable movement of two upper bars of each articulated linkage of a plurality of articulated linkages of the load lift system, wherein the two upper bars of each articulated linkage are connected to a platform arranged to hold the load to be lifted, wherein a top end of the two upper bars of each articulated linkage is positioned underneath a rail system with an open area between the rail system and the top end, wherein the platform comprises the rail system that includes two rails that are in parallel, wherein the rail system is configured to slide horizontally in one or more intervals over the top end of the two upper bars of each articulated linkage, wherein the elevating mechanism includes a hydraulic mechanism that actuates the two upper bars of each articulated linkage and a lever mechanism operatively connected to the hydraulic mechanism that transmits the lifting force from the hydraulic mechanism to the upper bars of each articulated linkage to raise and lower the platform in a vertical direction that enables the vertical movement, wherein the hydraulic mechanism comprises a handlebar arranged to be pulled up or pulled down to actuate the lever mechanism, wherein the lever mechanism moves ends of the two upper bars of each articulated linkage laterally when the lever mechanism is actuated, and wherein the hydraulic mechanism comprises one or more pistons connected to the hinge mechanism that actuate the hinge mechanism and guide the lever on a track attached to the two upper bars of each articulated linkage; and transmitting force to the two upper bars of each articulated linkage to actuate the vertical movement of the platform to lift the load to a desired height.

13. The method of claim 12, wherein the actuating the elevating mechanism comprises:

actuating a hydraulic cylinder in a hydraulic mechanism in the elevating mechanism to apply lifting force to the two upper bars of each articulated linkage, thereby lifting the platform and the load supported on the platform; and controlling the actuation of the elevating mechanism to raise or lower the platform to lift the load to the desired height.

14. The method according to claim 13, wherein the actuating further comprises:

pulling the handle bar of the hydraulic mechanism to actuate the lever mechanism in the hydraulic mechanism;

moving ends of the two upper bars of each articulated linkage laterally along base bars based on the pulling of the handle bar;

transmitting lifting force from the hydraulic mechanism to the two upper bars of each articulated linkage to raise; and raising and lowering the platform in a vertical direction based on the transmission of the lifting force.

* * * * *